United States Patent
Jones et al.

(10) Patent No.: US 10,146,732 B2
(45) Date of Patent: Dec. 4, 2018

(54) TIME-DIVISION MULTIPLEXED DATA BUS INTERFACE (71) Applicant: Apple Inc., Cupertino, CA (US)

(72) Inventors: Girault W. Jones, Los Gatos, CA (US); Nathan A. Johanningsmeier, San Jose, CA (US); Casey L. Hardy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 548 days.

(21) Appl. No.: 13/747,205

(22) Filed: Jan. 22, 2013

(65) Prior Publication Data
US 2014/0207983 A1 Jul. 24, 2014

(51) Int. Cl.
G06F 13/42 (2006.01)
G06F 3/00 (2006.01)
G06F 5/00 (2006.01)

(52) U.S. Cl.
CPC .......... G06F 13/4291 (2013.01); Y02D 10/14 (2018.01); Y02D 10/151 (2018.01)

(58) Field of Classification Search
CPC ............. H04L 5/023; H04L 2012/5674; H04L 2012/5675; H04L 2012/6459; G06F 13/38; G06F 13/372
USPC ............................................ 710/45, 58, 105
See application file for complete search history.

(56) References Cited

U.S. PATENT DOCUMENTS

| | | | |
|---|---|---|---|
| 5,691,660 A * | 11/1997 | Busch | G06F 1/10 327/141 |
| 6,327,259 B1 * | 12/2001 | Chiu et al. | 370/375 |
| 6,539,034 B1 | 3/2003 | Shimosaka | |
| 6,552,607 B1 * | 4/2003 | Danielson | 330/10 |
| 6,658,310 B1 | 12/2003 | Kamiya | |
| 6,782,007 B1 * | 8/2004 | Redman | 370/509 |
| 7,446,694 B1 * | 11/2008 | Ahmed | H03M 1/1255 250/237 G |
| 7,982,549 B1 * | 7/2011 | Husted et al. | 331/175 |
| 2004/0066271 A1 * | 4/2004 | Leck | G08C 17/02 340/3.1 |
| 2005/0117571 A1 * | 6/2005 | Dyke | 370/355 |
| 2006/0114940 A1 * | 6/2006 | Cho | G01D 21/00 370/498 |

(Continued)

FOREIGN PATENT DOCUMENTS

WO  WO-2012149303 A1  11/2012

OTHER PUBLICATIONS

"Time Division Multiplexed Audio Interface: A Tutorial", AN301, Cirrus Logic, Sep. 2006, AN301REV1, (4 pages).

(Continued)

Primary Examiner — Faisal M Zaman
(74) Attorney, Agent, or Firm — Womble Bond Dickinson (US) LLP (57) ABSTRACT An audio system bus has a bus data line and a bus clock line. Audio producers are coupled to the bus to form a time-division multiplexed multi drop bus interface arrangement having protocol slots 0, 1, . . . N where N is an integer greater than two. A bus device is coupled to the bus that produces a) a frame marker on the bus data line in slot 0, and b) a data bit on the bus data line in slot 1. The audio producers are to produce their respective audio data bits in their assigned slots other than slots 0 and 1. Other embodiments are also described and claimed.

14 Claims, 5 Drawing Sheets (56) References Cited

U.S. PATENT DOCUMENTS

| | | | |
|---|---|---|---|
| 2006/0235594 A1* | 10/2006 | Knoefler | F02D 41/266 |
| | | | 701/48 |
| 2008/0313375 A1 | 12/2008 | Van Vlimmeren et al. | |
| 2009/0316731 A1 | 12/2009 | Kong | |
| 2010/0142510 A1* | 6/2010 | Park | H04W 74/04 |
| | | | 370/345 |
| 2010/0272093 A1* | 10/2010 | Raravi et al. | 370/348 |
| 2011/0142066 A1 | 6/2011 | Kasai et al. | |
| 2011/0299457 A1 | 12/2011 | Green, III et al. | |
| 2012/0092159 A1* | 4/2012 | Berezowski | G08B 25/009 |
| | | | 340/539.22 |
| 2012/0269253 A1* | 10/2012 | Daecke | H04L 25/03878 |
| | | | 375/232 |
| 2012/0327789 A1* | 12/2012 | Grenier | H04L 43/0864 |
| | | | 370/252 |

OTHER PUBLICATIONS

"Selecting A Serial Bus", *Dallas Semiconductor Maxim Engineering Journal*, vol. 59, http://pdfserv.maximintegrated.com/en/ej/EJ59.pdf, (Jan. 1, 2007) 5.

\* cited by examiner

TIME-DIVISION MULTIPLEXED DATA BUS INTERFACE

An embodiment of the invention is related to data bus communications and, in particular, to techniques that can transfer multiple real-time digital audio channels using a relatively small or low complexity bus interface circuit and low bus power consumption. Other embodiments are also described.

BACKGROUND

There are many electronic products that use multiple digital audio channels. In particular, professional digital audio recording workstations come to mind. Today, high volume consumer electronic products such as desktop computers, laptop and notebook computers, tablet computers, and smart phones are being developed that also use multiple digital audio channels. In such products, digital microphone circuits are being used for improved noise immunity. In a digital microphone circuit, a relatively small (low complexity) integrated circuit, IC, interfaces with an otherwise analog sound pickup device (acoustic microphone), by converting an analog microphone signal into digital form and then transmitting the digital signal to a so-called "host" IC, such as an audio codec chip. In one case, a two-wire data bus arrangement is used to carry up to two audio channel signals of pulse density modulated audio data (from two separate microphones). The host IC supplies a clock signal on one of the wires, while the other wire carriers the data signal. The two microphone circuits take turns driving their data signal on the single, shared data line. More specifically, one of them drives its data signal while the clock is low, and the other drives while the clock is high. This is referred to as a time-division multiplexed data bus interface. The host IC detects the two channels of audio data as a function of the clock signal phase, and provides the detected microphone channels to any desired digital audio processing blocks, e.g. for signal enhancement. These audio channels may be part of for example a live audio or audio+video recording (e.g., streaming) session such as a conference call, where the two microphones may be used for improved sound capture quality (as compared to a single microphone).

There is a need for a relatively low cost and low power bus arrangement that can support substantially more than two digital microphone circuits, in a high volume consumer electronics product. One solution would be to simply add another bus data line, which can support an additional two microphones, and to continue adding an additional bus data line for each additional pair of microphones as needed. That, however, would increase the number of pins in the host IC that are to be dedicated for interfacing with such a bus. A more compact solution is desirable.

SUMMARY

An embodiment of the invention is directed to a time-division multiplexed data bus interface that can support substantially more than two audio sources (e.g., microphones) without increasing the number of pins needed for the integrated circuits that implement the bus interface circuits, beyond a single clock line and a single bus data line. A time-division multiplexed data bus protocol is described, in which each frame interval may be defined with successive time slots 0, 1, 2, . . . N, where N is an integer greater than 2. A sufficiently high clock frequency is selected, in view of for example the sampling rates used in the audio sources (whose digitized data is to be transferred over the bus in a time-division multiplexed manner). The clock is used for synchronization purposes, by the bus devices, where the bus devices will drive their respective device data on the bus data line.

In one embodiment, the following operations are performed over a number of frame intervals by a first bus device and a second bus device. The first bus device drives a frame marker on the bus data line in slot 0. The frame marker has a number of frame marker bits where each bit is driven by the first bus device in a respective instance of slot 0 in the frame intervals. Next, in slot 1 the first bus device drives the bus data line with its device data. Next, in an assigned slot other than slots 0 and 1, the second bus device drives the bus data line with its device data. The above process may repeat in each subsequent frame interval.

Now, after the first bus device has driven the frame marker bit in slot 0 and its data in slot 1, it presents essentially an open circuit or high impedance to the bus data line until the next instance of slot 0 (in a subsequent frame interval). This behavior may be shared by all of the other devices on the bus, such that once any given device has finished driving its data within its assigned slot, it presents a high impedance to the data bus line until the next instance of its assigned slot. In a further embodiment, the arrangement is such that when no bus device is pulling the bus data line to a logic high or logic low, the bus data line voltage could float up or down within a sequence of two or three high impedance slots that are occurring in a given frame. As such, the bus device that has been assigned the task of driving the frame marker in slot 0, also needs to drive its data in the next consecutive slot 1.

Knowledge of such a protocol may be "built into" all of the bus devices, which will enable each of the other bus devices to detect the frame marker and, as a result, determine the occurrence of their assigned slot in each frame interval. For example, if the second bus device is assigned to slot 4, and if each slot is defined to be essentially a half cycle of the clock, then each bus device will "know" when to drive the data line, once it has identified the frame marker pattern contained within slot 0. This bus arrangement thus allows for a relatively low cost implementation in terms of the complexity and amount of logic circuitry needed to implement the bus interface circuit of each bus device, as well as providing for a low power consumption arrangement since the bus data line need not have any pull up or pull down circuits connected to it.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
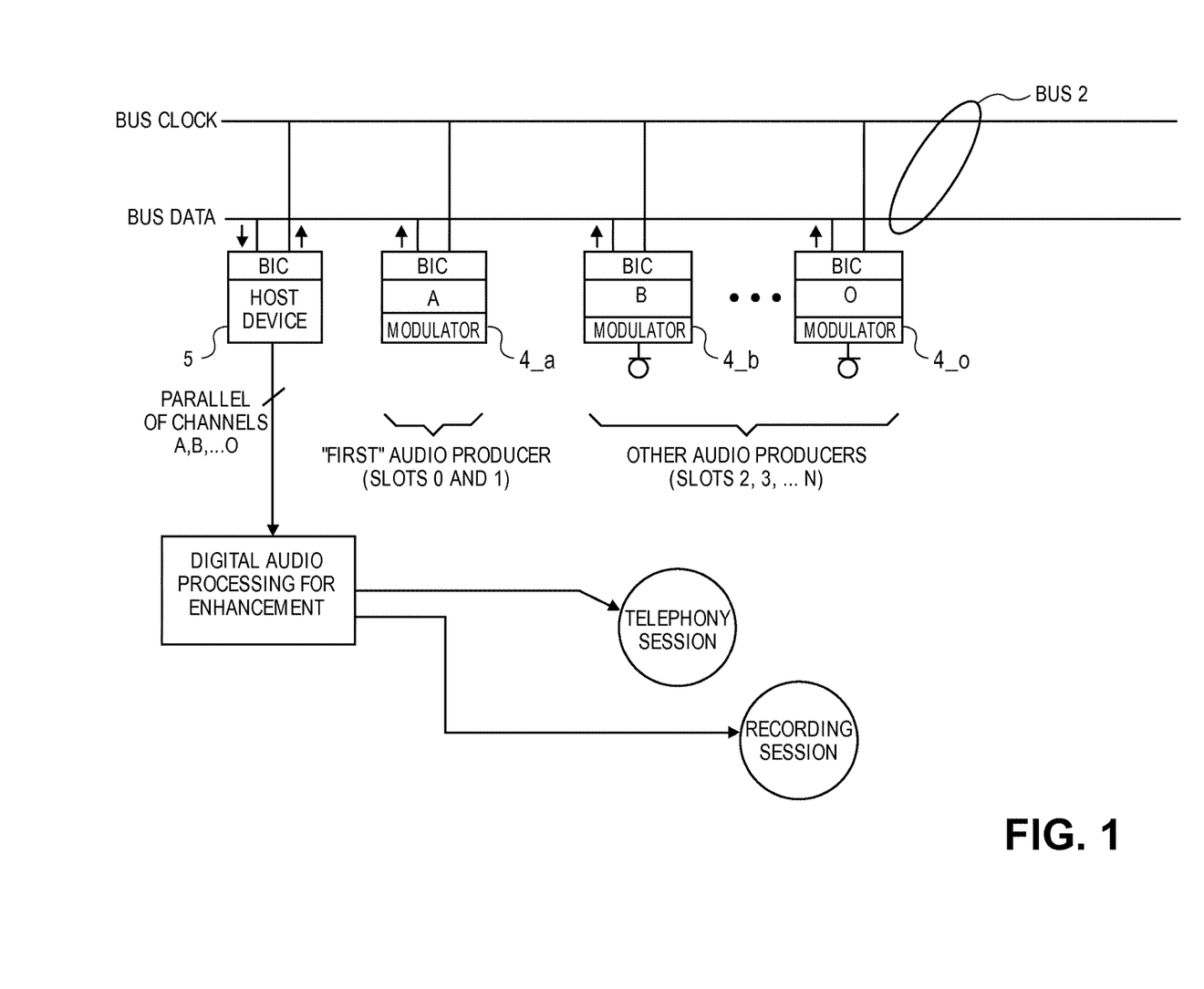
FIG. 1 is a combined circuit schematic and block diagram of a consumer electronics product in which multiple audio producer bus devices can transfer their audio data to a host device through a time-division multiplexed data bus.

FIG. 1 is a combined circuit schematic and block diagram of a consumer electronics product in which multiple audio producer bus devices 4 can transfer their audio data to a host bus device 5 through a data bus 2. The product may be, for example, a desktop computer, a laptop or notebook computer, a smart phone, or a headset, having multiple microphone circuits, where each producer bus device may be a separate microphone circuit. In the case of a headset, the bus 2 having a bus clock line and a bus data line as shown may be in an electrical cable that connects a pair of earphones to an audio accessory jack that is built into, for example, a smart phone housing or a laptop or tablet computer housing, e.g. a tip, ring, ring, sleeve (TRRS) 3.5 mm headphone jack. In the case of a desktop computer for example, the bus 2 may have multiple segments through a printed circuit board and one or more flex circuits that run to disparate locations of the desktop computer housing. In both instances, a number of microphone circuits may be connected to the bus 2, as the audio producer bus devices 4. The bus interface is a multi-drop bus arrangement in that the bus devices 4, 5 are electrically connected to the same bus data line in parallel as shown. Although not shown, there may also be a single ground line or ground plane (for purposes of a power return), to which all of the bus devices 4, 5 may be connected.

Each producer device 4 includes a bus interface circuit (BIC) that serves to translate between signals on the bus (bus data line and bus clock line) and signals from a modulator circuit. The signaling on the bus data and clock lines may be, for example, non-return to zero (NRZ) signaling. Other suitable data encoding approaches may be used. Also, a bus clock is available that in this case is driven by a BIC of a host device 5 onto a separate bus clock line. The clock is used by the BIC in each of the producer devices 4 for purposes of detecting a frame marker on the data line, and in response driving the producer devices respective content on the bus data line.

In the host device 5, a bus clock is generated and a BIC drives the bus clock onto the bus clock line of the bus 2. In addition, the BIC in the host device 5 also serves to detect the frame marker on the bus data line, and then uses the detected frame marker to extract the data of each of the producers 4_a, 4_b, . . . from the bus data line.

In one embodiment, the modulator in each audio producer 4 is responsible for converting an analog signal into digital form, from a microphonic or audio sensor, e.g. an acoustic pickup transducer or sound pickup microphone, a non-acoustic audio transducer. The digitally formatted or encoded signal can then be driven by the BIC onto the bus data line. Examples of such conversion formats include pulse density modulation (PDM), pulse code modulation (PCM), and pulse with modulation (PWM). To obtain a PDM bit stream, a delta signal modulation technique may be used, which may present a particularly efficient solution in terms of circuit complexity.

In one embodiment, there is no pull-up or pull-down on the bus data line, other than when a bus device is driving the data line. In other words, the bus data line is in a high impedance state (high-Z) so that its voltage can essentially float, while no bus device is driving the data line, i.e. all of the bus devices are presenting essentially open circuits to the bus data line, by neither pulling the line down to a logic 0 nor up to a logic 1 in the case of binary signaling. In other words, no bus device is sourcing a substantial current into, or sinking a substantial current from, the bus data line. This helps reduce power consumption, although it does present a challenge for detecting the frame marker, as will be described below. This arrangement is suitable for a very lightweight data bus interface that requires a relatively small amount of simple logic circuitry within each BIC.

Still referring to FIG. 1, in this particular example, the bus system contains the host device 5, which as mentioned above is responsible for driving the clock. In addition, the host device 5 may collect audio data from the audio producer bus devices 4_a, 4_b, . . . 4_o, and provide that collected data through, for example, parallel paths to digital audio processing circuitry for signal enhancement. Such digital audio processing may include, e.g., microphone array beam forming or spatial processing, ambient noise suppression, automatic gain control, active noise cancellation, and acoustic echo cancellation. The results of such digital audio processing may be, for example, an uplink audio signal that contains the voice of a near-end user in a telephony session with a far-end user (e.g., during a cellular voice call, a VoIP voice or video call), or it may be multi-channel digital audio signals of a locally stored recording session.

Figure 2:
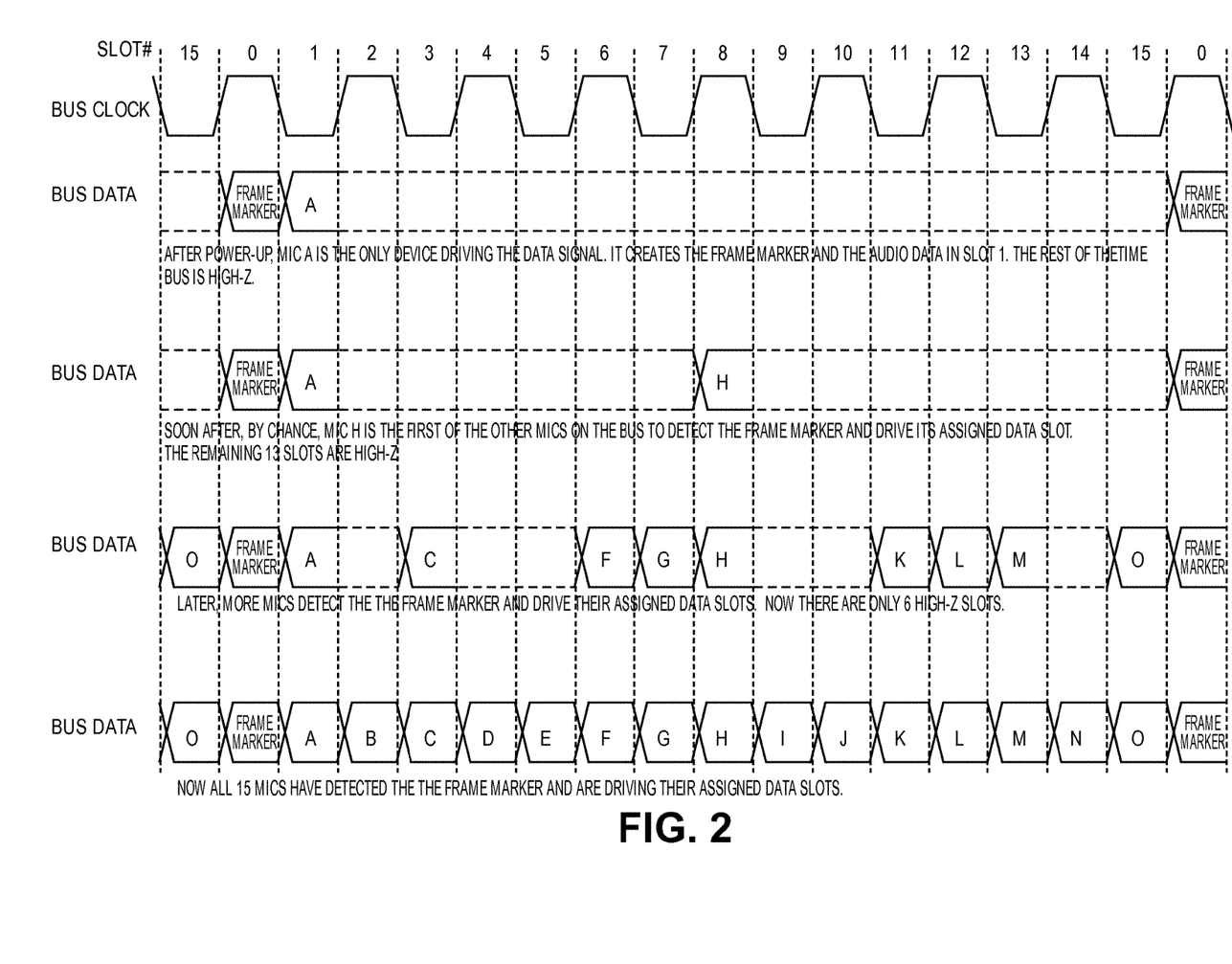
FIG. 2 is a timing diagram showing several frame intervals of the time-division multiplexed data bus protocol, in accordance with an embodiment of the invention.

A method for performing a time-division multiplexed bus protocol is now described in connection with the timing diagram in FIG. 2. This diagram shows several select snap shots being frame intervals of the bus protocol, where each frame interval (or simply, frame) constitutes successive time slots 0, 1, 2, . . . N where N is an integer greater than two. Frames generally take place consecutively, although those depicted in FIG. 2 are just a few selected frames that need not be consecutive. Each time slot is, in a sense, instantiated in each frame. In the example here, N=15, which translates into N+1 or sixteen slots in each frame. This allows the bus system to support fifteen (15) audio producers 4_a, 4_b, . . . 4_o (see FIG. 1) each assigned to drive its bus data in a selected one of the fifteen slots, plus a sixteenth slot that is assigned to contain a frame marker. The data driven by the audio producers 4 are depicted in FIG. 2 as labels A, B, . . . O, and the frame marker is so labeled. Also, the producer 4_a is referred to here as mic A, producer 4_b is mic B, etc. where in this example each producer is a separate microphonic circuit (or simply, mic).

Operation of the bus interface over several frames, as depicted in the example timing diagram of FIG. 2, may be as follows. Upon system power up or when all of the bus devices 4, 5 are reset, the host device 5 starts driving and maintains the clock signal so long as the bus system is powered up. At this time, all of the producer devices 4 (and also the host device 5) present a high-Z to the bus data line, and have been assigned their respective slots, e.g. via hardwiring in their respective BICs. In the particular example here, each slot is about as long as a separate half-cycle of the clock period (and may be "defined" by a consecutive pair of rising and falling edges of the clock signal), although as an alternative each slot may cover a single, full cycle or period of the clock.

A pre-designated one of the producer bus devices 4 (a "first" bus device that is assigned to slot 1, namely mic A or device 4_a in FIG. 1) detects the clock and then begins driving the frame marker. It may be the only one of the devices 4 that can do so. The frame marker is a set of bits (a pattern of discrete time values) that can be detected by all of the bus devices 4, 5 and that is to be used for synchronizing the driving of the shared data bus line (by the bus devices 4, 5) according to a given time-division multiplexed bus protocol. The frame marker has a number of bits, where each bit is driven by the device 4_a in respective instance of slot 0. For example, if the frame marker has four bits, then the frame marker is generated in slot 0 of four consecutive frame intervals.

Note that in one embodiment, the frame marker is driven by mic A in the slot that immediately precedes the one assigned to its content. In other words, after driving a frame marker bit in slot 0, mic A drives a bit of its audio data signal in slot 1. Since the bus data line voltage can float up or down within a sequence of two or three high-Z slots in a frame, it may not be reliable to allow the bus data line to float following a frame marker bit in slot 0, hence the desire here to configure mic A to then drive its audio data in slot 1. At slots 2-15, however, i.e. in the rest of the given frame interval, the bus data line remains high-Z while none of the devices 4 are driving the bus data line. In other words, mic A essentially presents an open circuit to the bus data line between the current instance of slot 1 until the next instance of slot 0. In the next consecutive frame, mic A drives the next bit of the frame marker in slot 0, followed by the next bit of its audio signal in slot 1. This driving of slots 0 and 1 repeats frame after frame, until all of the frame marker bits have been driven, at which point the driving of the frame marker in slot 0 repeats. Meanwhile, mic A can continue to drive its device data in consecutive instances of slot 1.

Next, some time later and by chance, a "second" device here mic H (device 4_h) becomes the first of the other audio producers, other than mic A (device 4_a) to detect the frame marker and in response drive its content (H) in its assigned data slot. Thus, as shown in the timing diagram, slots 0, 1 and 8 are driven in this frame, while all of the other slots in that frame are high-Z.

Later, more audio producers detect the frame marker and in response drive their assigned data slots. In the example timing diagram shown, the third snap shot shows a frame interval in which there are only six high-Z slots, while nine assigned data slots are driven.

Finally, as time passes, it is possible that eventually all of the audio producers 4 (in this case, N=15) detect the frame marker, and in response drive their respective assigned data slots. This is depicted in the last frame interval snap shot in FIG. 2, in which no high-Z slots remain.

It should be noted that the frame interval (or simply frame) need not start at slot 0 and end at slot N. For example, the frame could instead be defined to start at any one of the N+1 slots (e.g., start at slot k and end at slot k−1 where k can be 1, 2, . . . N+1). Thus, the references here to the frame marker being driven in slot 0 is actually a generic description, since slot 0 could be defined to occur essentially anywhere in the frame.

Also, the slots are depicted in FIG. 2 as having essentially the same, fixed length (in this case, one-half cycle of the clock, although as an alternative each slot may have a full-cycle length), so as to enable the use of simpler logic circuitry in the BIC for purposes of detecting the frame marker and enabling the BIC to maintain synchronization with the clock while driving its assigned data slot. In other words, each slot is coextensive with a half-cycle of the clock signal, and wherein each frame interval has a fixed length of (N+1)/2 cycles of the clock signal. Note also that the clock signal may alternatively be a sinusoid—it need not be a square wave as depicted in FIG. 2.

It should also be noted that in the case of the double pumped approach for driving the data bus line depicted in FIG. 2, the frame marker bit should be driven in the first half-cycle of the clock period.

With respect to a BIC driving its assigned data slot (or in the case of the first producer 4a also driving the frame marker) on the bus data line, it was mentioned above that each slot may be driven with a single "bit" of the frame marker and the audio bitstream. In one embodiment, each bit consists of a single, binary logic bit (having a value of either logic 0 or logic 1). In the case of using PDM for driving an audio bitstream, an audio producer 4 drives the bus data line with a sequence of binary logic bits (being a PDM version of an analog signal picked by its sensor), one binary logic bit per instance of the assigned data slot.

Figure 3:
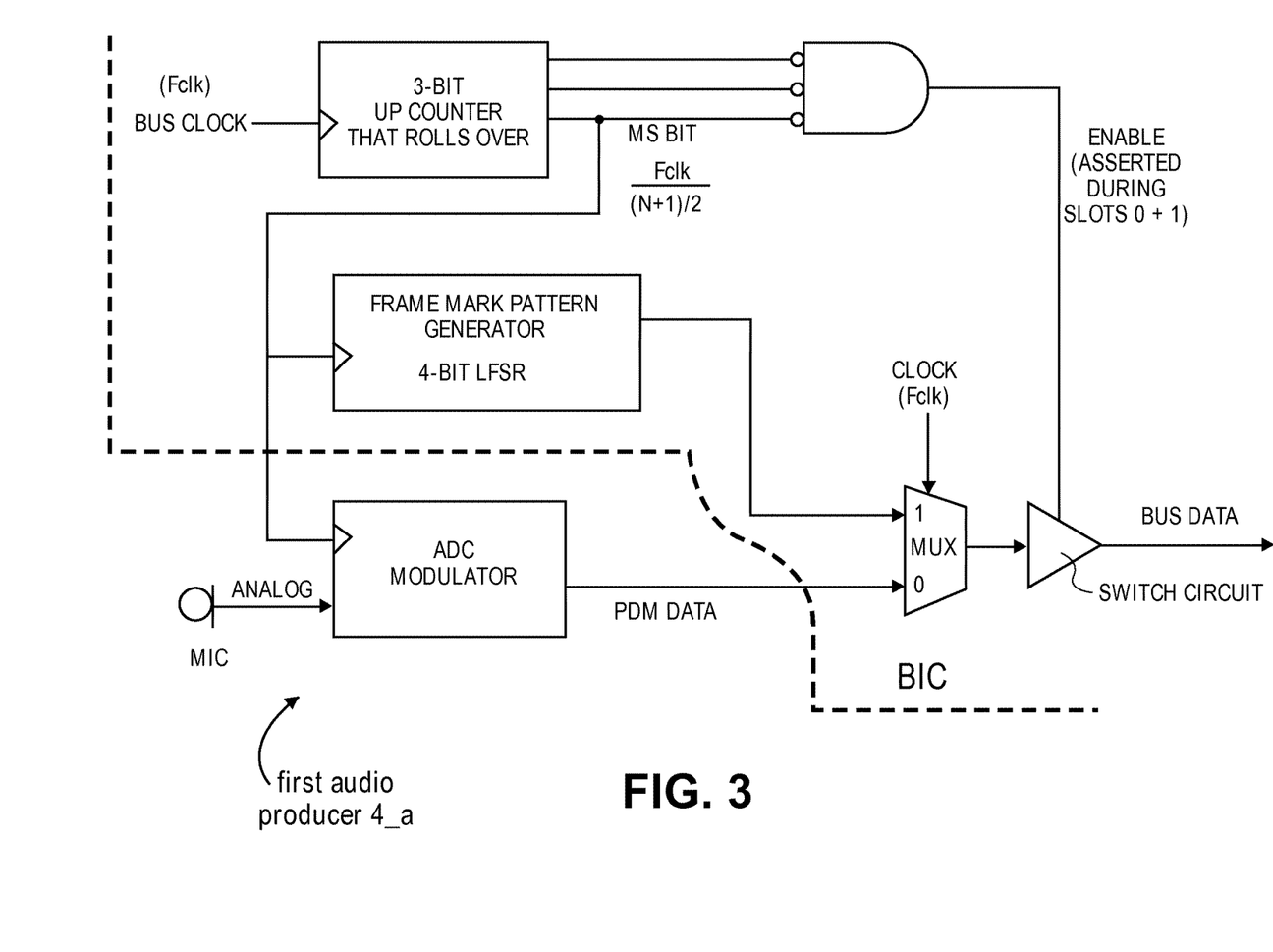
FIG. 3 shows a block diagram of an example bus interface circuit and modulator that may be present within the first audio producer bus device.

The time-division multiplexed data bus interface described above relies upon a BIC in just the first producer 4_a for generating a predetermined frame marker. FIG. 3 shows a block diagram of an example BIC and modulator that may be present within the first audio producer 4_a. The first audio producer 4_a may be an integrated circuit (IC) chip that in which a modulator circuit receives a data signal that contains content to be transferred over the bus 2, e.g. an analog audio signal produced by a connected microphonic sensor. The modulator in this case is referred to as an analog to digital converter (ADC) modulator, because it receives an analog signal from the sensor. The BIC has a multiplexor (mux) with a control input that is to receive a select signal synchronized with the clock signal (having fundamental frequency Fclk), where the latter may be obtained from the bus clock line (see FIG. 1).

A frame marker pattern generator has an output that is coupled to the 1 input of the mux, while the 0 input of the mux is coupled to an output of the modulator. The frame marker pattern generator may be implemented using a linear feedback shift register (LFSR) running at Fclk/[(N+1)/2], whose single bit output is XORed with the data bit that will be transmitted in slot 1 (through the 0 input of the mux), before being fed to the 1 input of the mux. In this particular example, the 0 input of the mux receives PDM audio data representing PDM conversion of an analog microphonic signal. The LFSR in this case is a 4-bit register whose output bit pattern repeats every 15 frames. As will be explained below in connection with FIG. 4, the other audio producers 4, the host device 5, and perhaps the consumer bus device 6, each may have a state machine that will search or hunt for the frame marker pattern, by for example XORing adjacent time slots and comparing the resulting sequence against the sequence generated by an identical 4-bit LFSR. Once frame marker sync has been achieved, the other producer 4 can locate its assigned data slot and drive its data bit in that slot.

A switch circuit has an input coupled to an output of the mux, while its output is to be coupled to the bus data line of the bus (see FIG. 1). A switch controller circuit is coupled to control the switch circuit, responsive to the clock signal having fundamental frequency Fclk. The switch controller contains a counter which is clocked at Fclk, and that generates the needed synch signal for driving the frame marker pattern generator so that the frame marker is produced with the correct timing. To properly drive the frame marker bit and the bus device data bit on the bus data line, the switch circuit should be enabled during slots 0 and 1 of the time-division multiplexed data bus protocol frame, having successive time slots 0, 1, 2, . . . N in each frame interval, where N is an integer greater than two (as was mentioned above). This may be achieved by combining the available outputs of the counter to generate an enable signal, which is designed to be asserted only during slots 0 and 1; the enable signal when asserted closes the switch circuit thereby allowing the mux output to drive the bus data line. The clock signal is used here to control the mux, so that in one half-cycle the frame marker bit is driven while in the other half-cycle PDM data is driven. Other logic circuit designs are possible for producing the needed control signals to drive the mux and the switch circuit. It should also be noted that in one embodiment, the switch circuit may be implemented as a tri-state buffer, which can present an open circuit to the bus data line when the enable signal is deasserted.

Figure 4:
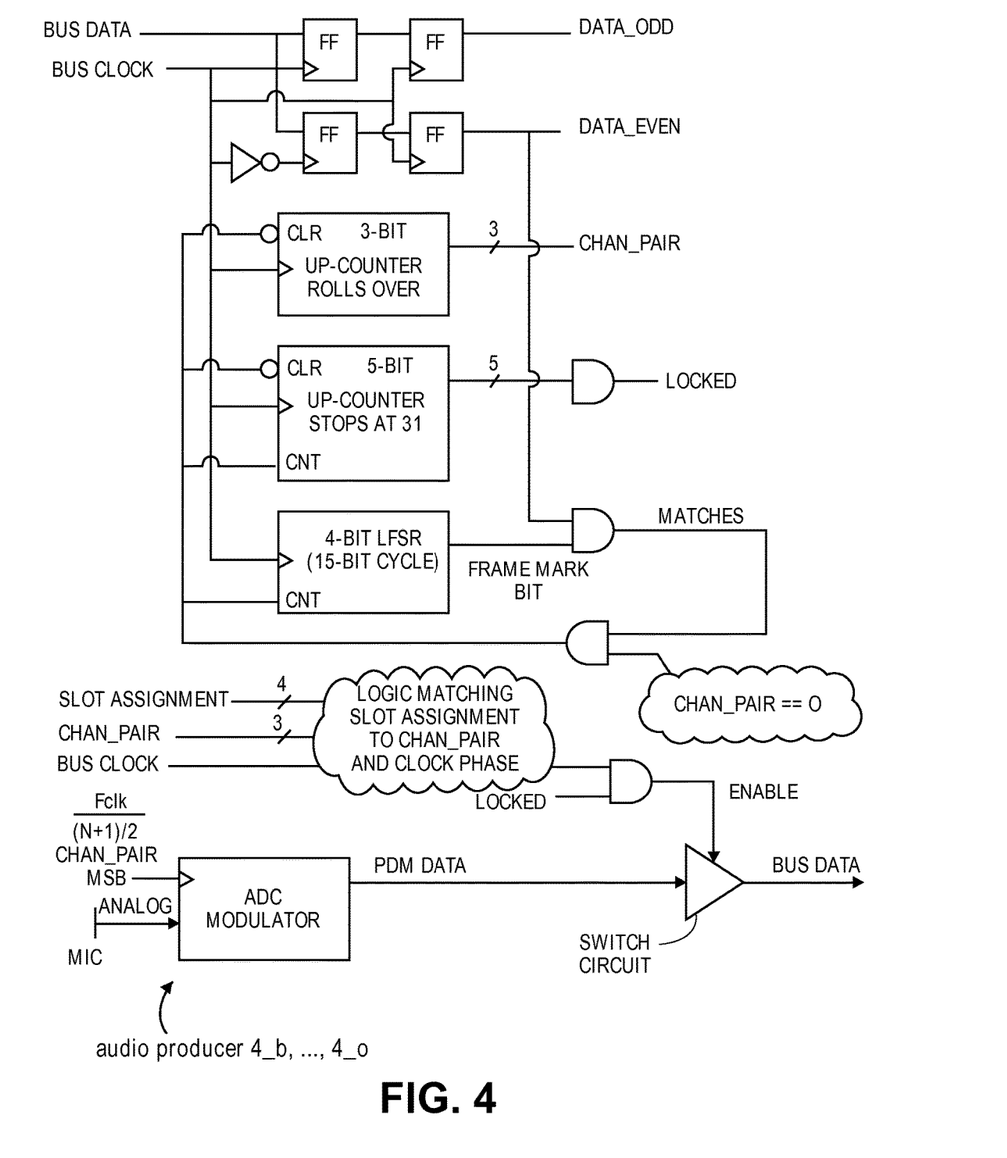
FIG. 4 is a logic block diagram of the bus interface circuit and modulator used in an audio producer other than the first audio producer.

FIG. 4 is a logic block diagram of a BIC and modulator used in an audio producer 4_b, 4_c, . . . 4_o, i.e. an audio producer other than the first audio producer 4_a. The block diagram may be that of an integrated circuit (IC) chip in which a modulator circuit receives a data signal that contains content to be transferred over the bus 2, e.g. an analog audio pick-up signal produced by a connected microphonic sensor. The modulator then encodes or converts the signal into a digital bitstream. Here, the modulator includes an ADC that converts the analog input from the microphonic sensor into a PDM audio bitstream, using a clock that has been derived from the bus clock (Fclk), e.g. having a fundamental frequency Fclk/[(N+1)/2] where N is the greatest number of audio producers 4 that may be coupled to communicate over the bus 2 at the same time. This portion of the BIC may thus be essentially identical to the one in the first audio producer 4_a described above in connection with FIG. 3.

Still referring to FIG. 4, the BIC portion of the IC chip in this case has frame synchronization logic that is responsive to the bus clock signal Fclk, and has an input to be coupled to the bus data line as shown. This logic detects the frame marker on the bus data line. In addition, the logic can derive the modulator clock, e.g. as the most significant bit of CHAN_PAIR as shown, which is the output of an up-counter that rolls over. Suitable flip flops, counters, and associated logic gates can be used to design the frame synch logic, including a 4-bit LFSR which may be identical to the one used in the first producer 4_a (FIG. 3) for generating the frame marker.

The BIC in FIG. 4 also has a switch circuit whose input is coupled to the output of the local modulator, and whose output is coupled to the bus data line. A switch controller contains logic for matching the slot assignment of this particular producer (the time slot with each frame of the time-division multiplexed data bus protocol) to the detected CHAN_PAIR and the bus clock phase. It generates an enable signal, which controls the switch circuit, responsive to the clock signal and to the frame synch logic. The switch circuit is thus enabled only during the assigned slot (which is a slot other than slots 0 and 1), resulting in the PDM data bit being driven onto the bus data line only in that slot.

Figure 5:
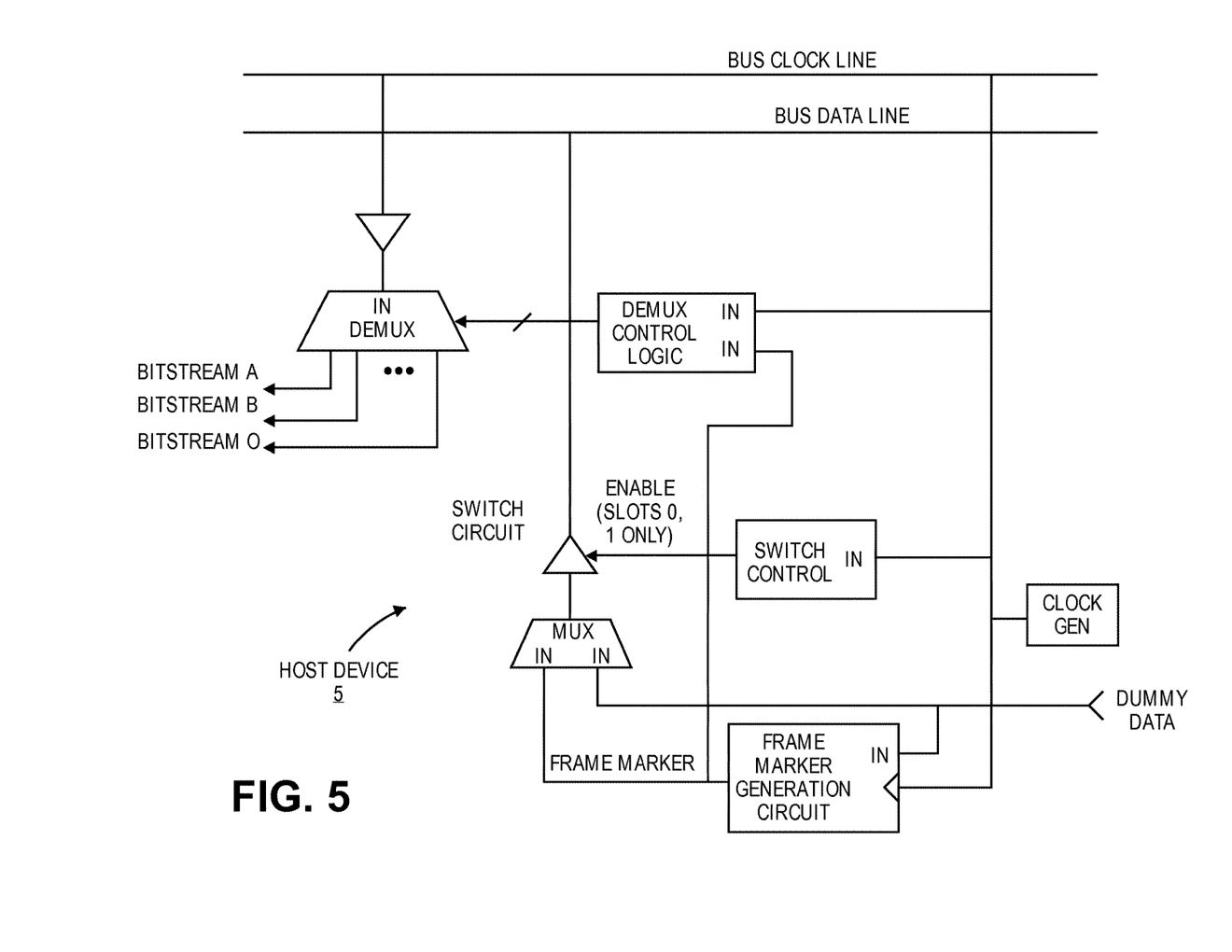
FIG. 5 is a combined circuit schematic and logic block diagram of an example bus interface circuit in a bus device that drives the frame marker on the bus and collects the producers' data from the bus.

The following additional points should be noted. First, although FIG. 1 shows the first audio producer 4_a as having the circuitry needed for producing the frame marker in slot 0, an alternative is to saddle the host device 5 with such a task. FIG. 5 depicts an example circuit schematic and logic diagram of such an IC device. Here, the host device 5 contains circuitry that not only collects and identifies the bitstreams (from the bus data line) of the producers 4_a, 4_b, . . . 4_o which are labeled as channels A, B, . . . O, using a demultiplexor and associated controller logic, but it also contains the frame marker generation circuit, the mux and the switch circuit of FIG. 3. In this case, a dummy data signal may be generated and driven in slot 1, which means that there is one fewer slot available for the audio producers 4_a, 4_b, . . . . In other words, for the example protocol described above in FIG. 2 where N=15, at most fourteen (14) different producers 4_a, 4_b, . . . 4_n can be connected to the bus, when the host device 5 is tasked with driving the frame marker.

Also, still referring to the BIC depicted in FIG. 5, the clock signal input to the various circuit elements in that case need not be routed from the bus data line, if a clock generator circuit (that produces the bus clock) has also been placed on-chip in the host device 5.

Another aspect of the invention is that although the example in FIG. 2 shows the case where all N of the available slots in the time-division multiplexed frame are in use (by N=15 different channels A, B, . . . O), there is the possibility that fewer than N audio producers can be connected. For instance, if there are only seven (7) audio producers 4_a, 4_b, . . . 4_g in a given audio system, then an N=15 arrangement and protocol can be used in that system by requiring that every other slot be skipped. This solution helps avoid the situation where adjacent slots are driven, such that timing overlap concerns are alleviated.

In another embodiment of the invention, a bus interface that uses a similar time-division multiplexed protocol as described above for FIG. 1 and FIG. 2 may be used to distribute multi-channel audio data from a single host device to N audio "consumer" devices. In that case, the host device can drive the content of multiple audio channels data onto the bus data line, each channel being driven in a respective slot of the protocol. Such content may be coming from for example a movie file having multi-channel surround sound, and that is being played back locally or being streamed over the Internet in the consumer electronics product. In that case, the bus system may have three or more audio consumer devices, where each device may have a loudspeaker circuit associated with a separate audio channel. The BIC in each consumer device detects the frame marker, and then decodes the bus data line signal to extract its respective digital audio channel signal, which it then provides to a demodulator, e.g. a digital-to-analog conversion (DAC) circuit that is part of the speaker circuit. An output of the DAC is an analog signal, which may then be applied to a power amplifier (e.g. a class D amplifier) to drive a speaker driver, thereby producing sound for the respective audio channel. Accordingly, multi-channel sound can be obtained in this manner when all of the consumer devices are operating simultaneously on the bus.

In yet another aspect of the invention, the bus interface described above can be adapted so that one or more of its slots can carry command or control words (rather than microphone streams, sensed data streams, or DAC input streams), from one bus device to several other bus devices.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 1 illustrates the bus system in the context of audio producers 4_a, 4_b, . . . where each has a microphonic sensor that generates the bus device data, other types of bus devices may also be connected, e.g. ones that drive generic inertial sensing data obtained from an inertial sensor, light intensity data obtained from an optical sensor and temperature data obtained from a thermal sensor. The description is thus to be regarded as illustrative instead of limiting.

What is claimed is:

1. A method for performing a time-division multiplexed data bus protocol having successive time slots 0, 1, 2, . . . N in each frame interval, where N is an integer greater than two, the method comprising
the following operations performed over a plurality of frame intervals, by a first bus device and a second bus device that are coupled to a bus data line:
driving a frame marker on the bus data line by the first bus device in slot 0, wherein the frame marker has a plurality of framer marker bits each being driven by the first bus device in a respective instance of slot 0 in the frame intervals;
driving the bus data line with a single bit of first device data in slot 1, by the first bus device, wherein the first device data is sensor data produced by the first bus device; and
driving the bus data line with a single bit of second device data in an assigned slot other than slots 0 and 1, by the second bus device, wherein the second device data is sensor data produced by the second bus device and wherein the frame marker bits are i) detected by the second bus device and by one or more other bus devices that are coupled to the bus data line, and ii) used for synchronization of driving of the bus data line with sensor data by the second bus device and by the one or more other bus devices in the successive slots 1, 2, . . . N, wherein each slot is coextensive with a half-cycle of a clock signal and each frame interval has a fixed length of (N+1)/2 cycles of the clock signal.

2. The method of claim 1 wherein driving the bus data line by the first bus device comprises:
driving each one of a plurality of data bits in a respective instance of slot 1 in a plurality of frame intervals, respectively, wherein the first bus device presents essentially an open circuit to the bus data line between slot 1 until the next instance of slot 0.

3. The method of claim 1 wherein driving the bus data line by the second bus device comprises:
the second bus device driving each one of a plurality of data bits in a respective instance of its assigned slot in a plurality of frame intervals, respectively, wherein the second bus device presents essentially an open circuit to the bus data line between its assigned slot until the next instance of its assigned slot.

4. The method of claim 1 wherein the bus data line remains essentially floating while no bus devices are driving the bus data line.

5. The method of claim 3 wherein each bit consists of a single binary logic bit.

6. The method of claim 5 wherein driving the bus data line by the second bus device comprises:
driving the plurality of data bits in accordance with pulse density modulation, one binary logic bit per instance of the assigned slot.

7. The method of claim 2 wherein the plurality of data bits driven by the first bus device are one of a) an audio stream, b) a command or control word and c) dummy data.

8. A system for performing a time-division multiplexed data bus protocol having successive time slots 0, 1, 2, . . . N in each frame interval, where N is an integer greater than two, the system comprising:
a bus having a bus data line and a bus clock line;
a first bus device coupled to the bus data line, wherein the first bus device is to drive, on the bus data line, a frame marker in slot 0 and a single bit of first device data in slot 1, in each frame interval, wherein the first device data is sensor data produced by the first bus device; and
a second bus device coupled to the bus data line, wherein the second bus device is to drive, on the bus data line, a single bit of second device data in an assigned slot other than slots 0 and 1, wherein the second device data is sensor data produced by the second bus device, and wherein the frame marker is i) detected by the second bus device and by one or more other bus devices that are coupled to the bus data line, and ii) used for synchronization of driving of the bus data line with sensor data by the second bus device and by the one or more other bus devices in the successive slots 1, 2, . . . N, wherein each slot is coextensive with a half-cycle of a clock signal and each frame interval has a fixed length of (N+1)/2 cycles of the clock signal.

9. The system of claim 8, wherein the first bus device is to drive each one of a plurality of data bits in a respective instance of slot 1 in a plurality of frame intervals, respectively, wherein the first bus device is to present essentially an open circuit to the bus data line between slot 1 until the next instance of slot 0.

10. The system of claim 8, wherein the second bus device is to drive each one of a plurality of data bits in a respective instance of its assigned slot in a plurality of frame intervals, respectively, wherein the second bus device is to present essentially an open circuit to the bus data line between its assigned slot until the next instance of its assigned slot.

11. The system of claim 8, wherein the bus data line remains essentially floating while no bus devices are driving the bus data line.

12. The system of claim 10, wherein each bit consists of a single binary logic bit.

13. The system of claim 12, wherein the second bus device is to drive the plurality of data bits in accordance with pulse density modulation, one binary logic bit per instance of the assigned slot.

14. The system of claim 9, wherein the plurality of data bits driven by the first bus device are one of a) an audio stream, b) a command or control word and c) dummy data.

* * * * *